Sept. 27, 1938.  H. R. TEAR  2,131,487
CARTRIDGE FOR LUBRICANTS OR THE LIKE
Filed Nov. 16, 1936  2 Sheets-Sheet 1
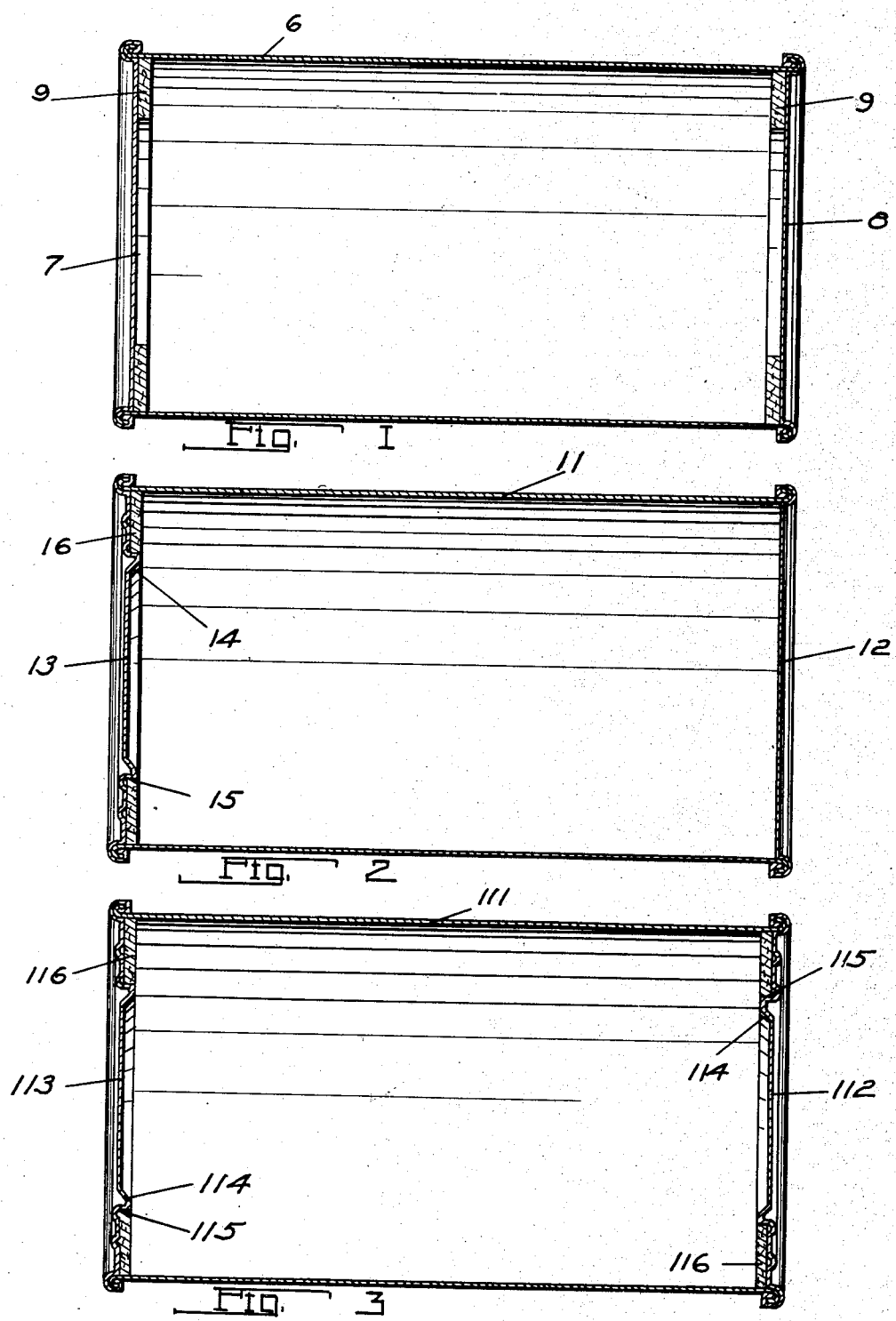
INVENTOR.
HARRY R. TEAR
BY McConkey & Booth
ATTORNEYS.

Sept. 27, 1938.  H. R. TEAR  2,131,487
CARTRIDGE FOR LUBRICANTS OR THE LIKE
Filed Nov. 16, 1936   2 Sheets-Sheet 2
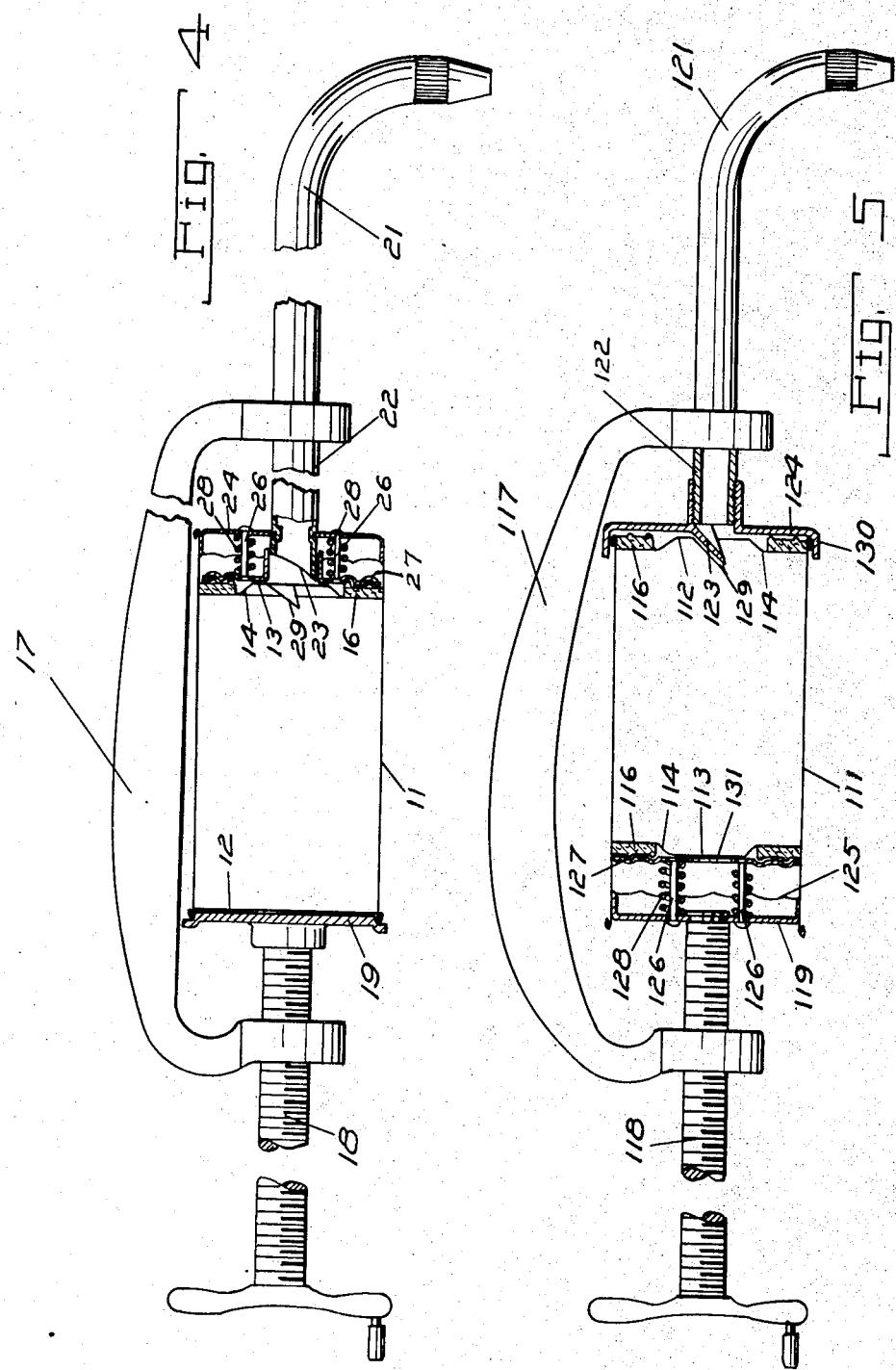
INVENTOR.
HARRY R. TEAR.
BY McConkey & Booth
ATTORNEYS.

Patented Sept. 27, 1938

2,131,487

UNITED STATES PATENT OFFICE 2,131,487

CARTRIDGE FOR LUBRICANTS OR THE LIKE

Harry R. Tear, Evanston, Ill., assignor to The Lubrication Corporation, Chicago, Ill., a corporation of Delaware Application November 16, 1936, Serial No. 110,968

5 Claims. (Cl. 221—47.3)

This invention relates to cartridges for lubricant or the like and more particularly to cartridges or containers which are filled and sealed at the factory and from which the contents are adapted to be dispensed directly to the point of use.

There are a number of advantages to the marketing of lubricants in factory filled, factory sealed containers or cartridges, among which are ease and cleanliness of handling, freedom from contamination, and insurance to the consumer that he is receiving the desired grade and brand of lubricant. It is essential, however, that such cartridges be very inexpensive so that they will not increase too much the cost of the lubricant and that lubricant can be dispensed from the cartridges quickly and easily and without leakage.

It is, accordingly, one of the objects of the present invention to provide a factory filled, factory sealed lubricant cartridge which is inexpensive to manufacture and from which lubricant can be dispensed quickly and easily.

Another object of the invention is to provide a sealed cartridge for lubricant or the like which contains an annular packing disc to insure removal of all of its contents without leakage.

Still another object is to provide a cartridge for lubricant in which one end of the cartridge is formed with a circular outwardly facing shoulder to support an annular packing.

One cartridge embodying the invention is formed with a cylindrical sheet metal body having sheet metal ends crimped or otherwise permanently secured thereto. Adjacent at least one end, and preferably adjacent both ends, an annular packing disc of paper or other fibrous material is placed in sealing engagement with the end and with its periphery in sealing engagement with the cartridge body. If desired, the disc may be cemented to the cartridge end to insure a tight seal therebetween and to prevent displacement of the disc.

One form of cartridge includes an inwardly pressed annular ring in its end forming an outwardly facing circular shoulder. This shoulder engages the radially inner edge of the annular packing disc to insure centering of the disc and to provide a further seal between the disc and the cartridge end.

In the illustrated forms, the cartridges are adapted to contain lubricant for transmissions, differentials and the like and are intended for use with devices for dispensing their contents under relatively low pressure. In one device the center of one end of the cartridge is punched out at the center of the annular sealing disc to provide an outlet opening and the same end of the cartridge is then cut out around its periphery and forced through the cartridge to dispense its contents. Another form of device punches an outlet opening in one end of a cartridge and cuts out the opposite end, forcing the cut out end through the cartridge to dispense its contents.

Other objects, advantages and novel features of the invention will be apparent from the following description of the accompanying drawings, in which:

Figures 1, 2 and 3 are axial sections of three cartridges embodying the invention; and Figures 4 and 5 are side views with parts in section of two dispensing devices for use with the cartridges of Figures 1 to 3.

The cartridge illustrated in Figure 1 includes a cylindrical sheet metal body 6 having ends 7 and 8 permanently secured thereto as by means of crimped seams. An annular packing disc 9 is placed in the cartridge adjacent each of the ends 7 and 8 with one face in sealing engagement with the adjacent end and with its periphery sealingly contacting the inner surface of the body 6. Preferably the discs 9 are cemented to the cartridge ends to provide a leakproof seal therebetween and to hold the discs in proper location on the cartridge ends.

The sealing or packing discs 9 are preferably formed of fibrous material which is rigid enough to retain its form and yet soft enough to form a good seal with the cylindrical body 6. One suitable material which is at the same time very inexpensive is paper impregnated with sizing material to make it impervious to lubricants. I have found that paper impregnated with wax or with a mixture of glue and glycerin has both the required body and softness and can be purchased at a low price commercially.

It will be seen that each end of the cartridge is permanently secured to the cartridge body and is provided with sealing means inside of the cartridge for forming a seal between the end and the body. The center portion of the end is not covered by the packing material and is adapted to be cut to form an outlet opening as will be described later. It will be apparent that a packing disc need be placed at only one end of the cartridge if desired, the packings at both ends being merely for the purpose of permitting reversibility.

Figure 2 illustrates another form of cartridge including a cylindrical sheet metal body 11 having a plain end 12 permanently secured thereto by crimping or the like. The opposite end of the body is closed by a sheet metal end 13 formed with an annular depressed portion 14 providing an outwardly facing annular shoulder 15 substantially parallel to the body 11. A sealing disc 16 is placed in the cartridge in sealing engagement with the end 13, the shoulder 15 and the inner wall of the body 11, the disc being cemented in place if desired.

One easy method of assembling the cartridge is first to secure the end 13 to the body 11 and then to press the disc 16 into place through the open end of the cartridge. The cartridge may thereafter be filled and sealed by crimping the end 12 in place. As an alternative method the disc 16 may first be secured to the end 13 and pressed into one end of the body 11 as the end 13 is secured thereto.

Figure 3 illustrates another form of cartridge which is similar to that shown in Figure 2 and in which parts corresponding to like parts in Figure 2 are indicated by the same reference numbers plus 100. In this form both ends 112 and 113 are formed with an annular depression 114 providing an outwardly facing shoulder 115 and a sealing disc 116 is provided at each end. With this arrangement the cartridge is reversible so that no care need be taken which end is cut out during use.

Figure 4 illustrates one type of dispenser with which any of the above described cartridges may be used but which has been shown with the cartridge of Figure 2. The dispenser includes a frame member 17 carrying a feed screw 18 at one end. A plate 19 is carried by the inner end of the feed screw 18 and is adapted to seat on the end 12 of the cartridge. The opposite end of the frame 17 carries a discharge nozzle 21 having a rigid extension 22 extending toward the feed screw and of substantially the same length as the cartridge. At its inner end the extension 22 rigidly carries a tubular knife 23 and a disc 24 formed with an annular knife 25 of substantially the same external diameter as the internal diameter of the cartridge. The disc 24 slidably receives a series of rods 26 which are rigidly secured to a pusher plate 27, compression springs 28 surrounding the rods 26 and urging the plate 27 away from the disc 24.

In use a cartridge is placed in the dispenser with the plate 19 engaging the end 12 and the pusher plate 27 engaging the end 13. As the screw 18 is turned the cartridge is moved bodily toward the discharge nozzle, forcing the plate 27 toward the plate 24 and compressing the springs 28 until the central knife 23 engages the end 13 and cuts out the center portion thereof as indicated at 29. Further movement forces the knife 25 through the end 13 adjacent its periphery to cut substantially the entire end loose from the cartridge body. As soon as the end 13 is cut out the springs 28 expand to force the pusher plate 27 back to its original position beyond the knives 23 and 25, at the same time forcing the cut out end 13 and the disc 16 into the cartridge to displace a part of the contents thereof out through the extension 22 and nozzle 21. To dispense the remainder of the cartridge contents the screw 18 is turned to move the cartridge bodily until the end 12 and disc 16 lie against the end 12, the disc 16 wiping along the body 11 during this movement to insure removal of all of the cartridge contents and to prevent leakage.

Figure 5 illustrates another type of dispenser for use with any of the cartridges of Figures 1, 2 or 3 and has been shown with the cartridge of Figure 3. Since the dispensers of Figures 4 and 5 are somewhat similar, parts in Figure 5 corresponding to like parts in Figure 4 have been indicated by the same reference numbers plus 100. In this dispenser the plate 119 is formed with or carries the annular knife 125 for cutting out the cartridge end 113 and the pusher plate 127 is mounted on the pins 126 which are slidably carried by the plate 119. The plate 124 is rigidly secured to the extension 122 and is formed with guide fingers 130 to receive and center the cartridge end. The plate 124 also carries a fixed triangular knife 123 adapted to puncture the end of the cartridge.

In using this type of dispenser a cartridge is placed in position with one end lying within the guide fingers 130 and with the pusher plate 127 engaging its other end. As the screw 118 is operated the knife 123 will cut through the end of the cartridge to form an outlet opening, the end of the cartridge seating on the plate 124. Further movement of the screw 118 will compress the springs 128 until the knife 125 engages and cuts out the end 113 of the cartridge at which time the springs will expand and push the cartridge end 115 and the packing disc 116 into the cartridge as shown. Continued operation of the feed screw will force the cut out end and packing through the cartridge to displace the contents out through the nozzle 121. If desired the pusher plate 127 may be formed with a central opening as shown at 131 so that the knife 123 will cut a hole in both ends of the cartridge when it is completely emptied, thereby destroying the cartridge.

While two types of dispensers have been shown and described, it is to be understood that the cartridges forming the subject matter of the present invention can be used with any suitable type of dispensing device, either manual or power operated. It will also be understood that various changes might be made in the cartridges themselves and it is not intended to limit the scope of the invention to the exact forms shown or otherwise than by the terms of the appended claims.

What is claimed is:

1. A cartridge for lubricant or the like comprising a cylindrical body and ends permanently secured to said body, one of said ends adapted to be cut out adjacent its periphery, and an annular disc-like sealing member having an open center, one face of said disc lying in sealing engagement with said one end and the periphery of the disc being in sealing engagement with the body.

2. A cartridge for lubricant or the like comprising a cylindrical body, ends permanently secured to said body, at least one of said ends having an inwardly pressed boss formed therein, and an annular sealing disc engaging said boss at its inner edge and in sealing engagement with said body at its periphery.

3. A cartridge for lubricant or the like comprising a cylindrical body, ends permanently secured to said body, at least one of said ends having an inwardly offset portion forming an outwardly facing annular shoulder, and an annular sealing disc having its inner edge engaging said shoulder and its periphery in sealing engagement with said body.

4. A cartridge for lubricant or the like comprising a cylindrical body, ends permanently secured to said body, at least one of said ends having an inwardly offset portion forming an outwardly facing annular shoulder, and an annular sealing disc cemented to said one end with its inner edge engaging said shoulder and its periphery in sealing engagement with said body.

5. A cartridge for lubricant or the like comprising a cylindrical sheet metal body, sheet metal ends permanently secured to said body, at least one of said ends being formed with an inwardly pressed portion forming an outwardly facing annular shoulder, and a fibrous sealing disc lying adjacent said end between said shoulder and the sheet metal body.

HARRY R. TEAR.